United States Patent Office 3,137,565
Patented June 16, 1964

3,137,565
METHOD OF PRODUCING A NON-CAKING
FERTILIZER AND THE PRODUCT THEREOF
John C. Hayes, Palatine, Ill., assignor, by mesne assignments, to W. R. Grace & Co., New York, N.Y., a corporation of Connecticut
No Drawing. Filed Jan. 28, 1957, Ser. No. 636,496
5 Claims. (Cl. 71—64)

This invention relates to the production of a coating agent for treating particulate hygroscopic materials. More particularly, it is directed to a new and improved means for obtaining, at low cost, a superior anti-caking coating agent for granulated or pelletized hygroscopic fertilizer materials.

In the production, transporting, storage and application of hygroscopic granular materials, as for example, chemical fertilizers, the propensity of such products, to cake and harden, particularly on storage, has been one of the most aggravating and serious problems in the industry. Chemical fertilizers as used herein has reference to discrete or homogeneous fertilizer materials such as prilled, flaked or granulated ammonium nitrate, as well as to complete fertilizers which contain nitrogen, generally in the form of ammonium sulfate or ammonium nitrate or similar salts high in nitrogen, phosphoric acid in the form of phosphate, and potash in the form of potassium salts; the fertilizer products containing these components are generally mechanically mixed to provide a uniform product with the composition balanced, as required, to provide compositions having such formulae identifications as 5-10-5, 4-12-4 and the like. While the immediate special interest is in coating ammonium nitrate prills, and while for purposes of illustration, references will be made hereinafter to the treatment of chemical fertilizers, it is to be understood, that the caking problem is common to a wide variety of hygroscopic materials in particulate form and that the present invention is not to be construed to be necessarily limited to the treatment of chemical fertilizers, hygroscopic salts, or any other particular hygroscopic material since those skilled in the art will recognize the application of the invention to such other materials.

The present invention represents a substantial and significant improvement over prior art products and methods of producing improved fertilizer, and represents, as will be seen from the presentation hereinafter, an important contribution in the art. In this regard, it is pointed out that my invention is particularly directed to the solution of caking problems associated with pre-formed granules or prills, as distinguished from powdered fertilizers, such as are disclosed in, e.g., U.S. Patent No. 2,669,510.

Granulated fertilizer, for example, is composed of particles predominantly plus 20 mesh, and ammonium nitrate prills such as are made by the Welland process have a diameter of about one or two millimeters. It is products of the foregoing types, rather than conventional powdered fertilizer, which are most effectively treated by my invention.

I have found in accordance with my invention that the incorporation into a particulate mass of hygroscopic materials such as granulated chemical fertilizer, salts such as prilled ammonium nitrate, and like materials, of a product derived from vermiculite ore has an astonishing effect in inhibiting the inherent caking properties of such salts and fertilizers.

It has generally been regarded in the past, that "low bulk density" was the most significant characteristic of what can be called a "parting agent," and in this regard scientific tests have shown that such low bulk density (e.g. about 7 to 12 lbs. per cubic ft.) materials as certain hydrated silicas, synthetic magnesium and calcium silicate and kieselguhr or diatomaceous earth were more effective generally speaking, in inhibiting caking of granular fertilizers than high bulk density materials, such as kaolinitic clay, montmorillonitic clay, calcium carbonate and fuller's earth. Anomalously, however, finely ground expanded vermiculite though having a bulk density approximating that of certain hydrated silicas, synthetic magnesium silicate and other low bulk density materials specified above, does not have as much effectiveness—despite its low bulk density—as the foregoing materials.

In pursuing a solution to the problem of improvement of performance characteristics of vermiculite, in regard to effectiveness as a parting agent, I have now found that unexpanded vermiculite which is treated in accordance with the hereinafter described method possesses, after such treatment, new physical characteristics, imparted thereto by such treatment, which give the resulting material unexpectedly improved properties making it eminently suitable for use as an anticaking agent for prilled ammonium nitrate, granulated chemical fertilizers and the like.

The preparation of the vermiculite derivative which is to be used in accordance with my invention includes, generally, subjecting unexpanded vermiculite to the action of a mineral acid, washing and drying the resulting product, and then coating fertilizer or hygroscopic salt particles by mixing or preferably tumbling the vermiculite product and the particles to be coated.

For optimum results the siliceous vermiculite coating material and the hygroscopic fertilizer or salt particles should be in a dry state, such as is obtainable by drying at 110° C. to substantially constant weight, prior to mixing and the resulting mixture should be bagged immediately following the completion of the mixing operation.

The mineral acid treatment of unexpanded vermiculite induces two phenomenal changes in the physical characteristics of the material. First of all, it is observed that, during the treatment, the vermiculite expands greatly in volume, oftentimes as much as 200 percent. It is this volume change which is largely responsible for the fact that the bulk density of the finished product is in the order of 15-22 pounds per cubic foot, whereas the bulk density of unexpanded vermiculite is in the order of 45-60 pounds per cubic foot. The second phenomenal alteration in physical characteristics attributable to the acid treatment is the creation of myriads of fine pores within the structure of the gross flakes. The surface area of unexpanded vermiculite, as determined by standard nitrogen adsorption methods, is in the order of 1-10 square meters per gram. The surface area of the products obtained by acid treatment ranges from 150 to as high as 500 square meters per gram, depending upon the type of original vermiculite and the conditions of the acid treatment. This tremendous change in the magnitude of the surface area actually represents an activation of the material and indicates that the acid treatment involves the creation of an extensive internal pore structure.

Not only unexpanded vermiculite, but thermally exfoliated vermiculite as well as other types of inorganic materials, hereinafter listed, can be activated with acid under controlled conditions to produce a product whose effectiveness as a coating or parting agent for anti-caking is substantially greater than that characteristic of the original material. The reaction with unexpanded vermiculite is, however, especially unique and interesting in that the activation reaction is accompanied simultaneously with an irreversible volume increase which leads to the production of a product of low bulk density and a high degree of adsorptive capacity.

It is to be understood that the degree of acid-treatment given to the vermiculite ore is variable over a wide range of time, temperature and acid concentration, and that even a small amount of such acid treatment has some beneficial effect. The acid treatment may be continued until the nitrogen surface area of the resulting finished product is at a maximum, namely in the vicinity of about 500 square meters per gram. We have found, however, that quite satisfactory materials may be produced by subjecting the vermiculite ore to acid treatment to a degree such that the product has a nitrogen surface area of preferably at least 150 sq. meters per gram, sufficient swelling occurring during the treatment to produce a finished product having a bulk density of about 15-22 pounds per cubic foot.

It is not necessary to extract all of the bases in the vermiculite by the acid used, since we have found that those physical characteristics which are reflected in efficiency of the product as a coating agent are induced long before extraction of all of the bases is complete, as seen in the table below.

TABLE I

| Material | Activation Conditions | Product Characteristics | | |
|---|---|---|---|---|
| | | Color | Bulk Density, lbs./ft.$^3$ | Surface Area, sq. meters per gram |
| Unprocessed vermiculite. | none | black | 50 | 2 |
| Acid-activated vermiculite. | 20 mins. in 18N$H_2SO_4$ at 80° C. | dark gray | 17 | 417 |
| Do | 30 mins. in 18N$H_2SO_4$ at 80° C. | gray | 19 | 483 |
| Do | 120 mins. in 18N$H_2SO_4$ at 80° C. | gray-white | 15 | 550 |

The end product obtained by severe acid treatment has been characterized as pure hydrous silica, a lightweight modification of silica gel. Insofar as utility as an adsorbent and absorbent anti-caking coating agent is concerned, the definitive properties are primarily physical and not chemical. A treatment time of as little as 20 minutes is sufficient to induce the necessary changes in physical characteristics. The function of the product as an anti-caking agent is not impaired by the fact that a considerable percentage of the original bases of the vermiculite remain in the product as a result of such a brief treatment or leaching time. It is, moreover, advantageous to retain basic constituents in the product since the original vermiculite is relatively rich in trace elements essential to plant growth. The following table indicates the type and approximate level of distribution of trace elements in unprocessed vermiculite.

TABLE II

*Trace Element Content of Unprocessed Vermiculite*

Elements: Approximate level of occurrence in vermiculite, percent
$Cr_2O_3$, $TiO_2$, $Na_2O$ _____ 0.1–1.5.
$P_2O_5$, MnO, NiO, $V_2O_5$, BaO, CoO _____ 0.01–0.1.
SrO, SnO, CnO, $ZrO_2$ _____ Less than 0.01.

I am aware that vermiculite has been acid-treated in the past to obtain pure hydrous silica. However, my invention differs from the prior art in that the resulting product obtained by acid-treating vermiculite in accordance with my technique is not only different from the products of the prior art, but furthermore, has unexpected and extremely advantageous properties which are eminently suitable for use in fertilizer conditioning, for example, as already pointed out. The contact time or leaching time in the case of my invention is, preferably, of the order of one hour or less.

For most efficient processing, such as for low acid consumption and the like, the vermiculite concentrate used should be of as high vermiculite content as possible. However, though this invention is primarily directed to acid-treatment of natural vermiculite, it must be understood that prior treatment of the ore to convert it, by ion exchange, for example, to another species such as sodium by treating with salt solution would not have a deleterious effect.

Furthermore, for best effectiveness it is obvious, of course, that the bulk density of the product be as low as possible since the more porous the material, and the more particles per pound present, the more effective it is.

As briefly mentioned hereinbefore, other siliceous materials might be used, provided they produce residues with physical characteristics like those characteristics of vermiculite upon acid treatment, such other products being exemplified by, for example, bentonite, attapulgite, asbestos, phlogopite, biotite, muscovite, serpentine, kaolin and so on.

From the practical standpoint, it is neither necessary nor desirable to leach vermiculite or other equivalent siliceous materials in the sense of removing completely all basic constituents to leave a pure hydrous silica residue. The product will have satisfactory utility for the purposes which are the subject of this invention when acid-activated only to the extent necessary to produce a product with a bulk density less than about 20 pounds per cubic foot and a nitrogen surface area in excess of about 150 square meters per gram. The utility arises from the fact that such low bulk density materials may be ground to produce tremendous numbers of discrete particles per pound of material, thus assuring satisfactory coverage in coating fertilizer chemical prills or pellets in addition to the fact that the individual particles of the product having a high nitrogen surface area possess a fine textured internal pore system capable of adsorbing relatively large quantities of water from atmospheres of low relative humidity. In effect, the processed vermiculite coating agent appears to act as a vapor barrier to previously dessicated hygroscopic fertilizer particles and prevents the formation of a solution phase which leads to caking tendencies.

At relative humidities above about 60%, ammonium nitrate prills will adsorb moisture. To give adequate protection, the coating agent must be able to adsorb preferentially any moisture that penetrates bags during storage. Vermiculite processed in accord with this invention will, if coating is performed under dry conditions, give superior protection since it is capable of adsorbing large quantities of moisture. The adsorbed water is not available for the formation of solutions of fertilizer salts. An example of the moisture adsorption capacity of acid-processed vermiculite is given in Table III.

TABLE III

*Typical Moisture Adsorption by Acid Activated Vermiculite*

| Relative humidity, percent | Percent moisture adsorbed (dry weight basis), percent |
|---|---|
| 10 | 6 |
| 20 | 9 |
| 30 | 13 |
| 40 | 18 |
| 50 | 21 |
| 60 | 23 |
| 70 | 24 |
| 80 | 25 |
| 90 | 26 |

Though the most practical way to obtain the desirable product of this invention is by the leaching of unexpanded vermiculite it is to be understood that the use of vermiculite which has been thermally expanded prior to leaching is contemplated as being within the scope of the present invention.

The following examples will illustrate one specific method of producing acid-leached vermiculite.

EXAMPLE I

No. 4 unexpanded vermiculite, approximately 30 mesh, was contacted with dilute sulfuric acid, made by diluting concentrated sulfuric acid with 3 volumes of water. The vermiculite was dumped into a vessel containing sufficient acid to cover it, and mixed 30 minutes, drained, and washed until the acidity was gone. Heating the acid, to say 100° C., speeds up the reaction of course, but whatever the time or concentration used, the end-point is approximately when the swelling of the vermiculite stops or when the product becomes light in color.

By way of illustration of the efficacy of my invention, tests were conducted wherein a quantity of prills of ammonium nitrate averaging about 1 mm. in diameter, was divided into four portions of about 1 pound each. Three of these 1 pound portions of prills were coated with various materials at a rate of 3% by weight. One portion was coated with a diatomaceous earth (Celite 545), one with thermally expanded and ground vermiculite, and one with vermiculite treated in accordance with the present invention as set forth in Example I above. The fourth portion was left uncoated as a control.

After mixing, the portions were transferred to small plastic bags, sealed by tying the neck of the bag and loaded uniformly with weights. After 24 hours of such loading the weights were removed and samples examined. It was found that the uncoated control portion was badly caked, the portion treated with acid-leached vermiculite showed vertually no caking, and the portion coated with ground expanded vermiculite and diatomaceous earth were caked but not as badly as was the uncoated control material.

My coating or parting agent is generally most effective when applied to the granules of chemical fertilizer, or other hygroscopic material which is to be treated, as a powder whose particles are predominantly less than 100 mesh and preferably minus 200 mesh. The particulation can be done in a hammermill or a diskmill.

Up to about 5% of this product can be used with the fertilizer very effectively, although rates of application as low as 0.5% by weight may be used, depending upon the type of fertilizer being coated and the eventual conditions of storage of the finished product.

While I prefer to use sulfuric acid in the hereinbefore described vermiculite treatment, any other mineral acid, excepting hydrofluoric, can be used, the treatment being terminated when the resulting product reaches a bulk density (in dry form) of about 15 to 22 pounds per cubic foot, and the resulting particles have a nitrogen surface area of preferably at least 150 square meters per gram.

Drying the acid activated, water washed product at temperatures in the range of 105°–300° C. in order to remove adsorbed water prior to use is necessary to obtain optimum performance of the product.

Since certain changes in carrying out the above process and modifications in the product used in the invention may be made without departing from its scope, it is intended that all matter contained in the above description shall be interpreted as illustrative and not in a limiting sense.

I claim:

1. A method of producing a non-caking, free-flowing granular commercial fertilizer product which comprises mixing a granular fertilizer composition with a small amount of dry, finely-divided particles of acid-treated vermiculite, said acid-treated vermiculite being prepared by contacting the vermiculite with a strong mineral acid other than hydrofluoric acid, washing the vermiculite until it is substantially acid-free, and thereafter drying the resultant acid-free vermiculite.

2. A method in accordance with claim 1 in which the granular fertilizer is a mineral ammonium salt.

3. A method in accordance with claim 1 in which the granular fertilizer is ammonium nitrate.

4. A non-caking composition of solid hygroscopic granular commercial fertilizer particles coated to improve storage qualities, said coating consisting of a 0.5 to 3.0 percent by weight of finely-divided sorptive siliceous mineral having been treated prior to said coating with a substantial amount, based on the total weight of said siliceous coating substance employed, of a strong mineral acid other than hydrofluoric acid and having been washed until it is substantially acid-free, and thereafter dried.

5. A composition as in claim 4 wherein the granular commercial fertilizer is a mineral ammonium salt.

References Cited in the file of this patent

UNITED STATES PATENTS

| | | |
|---|---|---|
| 2,008,469 | Prince | July 16, 1935 |
| 2,341,800 | Martin et al. | Feb. 5, 1944 |
| 2,498,480 | Bierlich | Feb. 21, 1950 |
| 2,669,510 | Dresser | Feb. 16, 1954 |
| 2,702,747 | Studebaker | Feb. 22, 1955 |
| 2,779,670 | Burkett | Jan. 29, 1957 |